United States Patent [19]

Yu

[11] Patent Number: 6,067,552
[45] Date of Patent: May 23, 2000

[54] USER INTERFACE SYSTEM AND METHOD FOR BROWSING A HYPERTEXT DATABASE

[75] Inventor: Tonny Yu, Fremont, Calif.

[73] Assignee: CNET, Inc., San Francisco, Calif.

[21] Appl. No.: 09/052,050

[22] Filed: Mar. 30, 1998

Related U.S. Application Data

[63] Continuation-in-part of application No. 08/517,136, Aug. 21, 1995, abandoned.

[51] Int. Cl.[7] .................................................... G06F 17/30
[52] U.S. Cl. ................................................ 707/501; 707/5
[58] Field of Search ............................ 707/3, 5, 6, 501, 707/513; 345/334, 356, 357

[56] References Cited

U.S. PATENT DOCUMENTS

| | | | |
|---|---|---|---|
| 5,408,655 | 4/1995 | Oren et al. | 707/5 |
| 5,418,948 | 5/1995 | Turtle | 707/501 |
| 5,452,468 | 9/1995 | Peterson | 345/419 |
| 5,488,725 | 1/1996 | Turtle et al. | 707/4 |
| 5,729,730 | 3/1998 | Wlaschin et al. | 707/3 |
| 5,893,087 | 4/1999 | Wlaschin et al. | 707/1 |
| 5,913,215 | 6/1999 | Rubinstein et al. | 707/3 |
| 5,933,822 | 8/1999 | Braden-Harder et al. | 707/3 |
| 5,983,248 | 11/1999 | Derose et al. | 707/513 |

OTHER PUBLICATIONS

J. Conklin, "Hypertext: An Introduction and Survey", IEEE Computer, Sep. 1987, pp. 17–41.

D.C. Blair et al., "An Evaluation of Retrieval Effectiveness for a Full Text Document Retrieval System", *Communications Of The ACM*, Mar. 1985, vol. 28, No. 3, pp. 289–299.

N. Yankelovich, et al., "Intermedia: The Concept and the Construction of a Seamless Information Environment", IEEE Computer, Jan. 1988, pp. 81–96.

M. Frisse, "Searching for Information in a Hypertext Medical Handbook", *Communications Of The ACM*, Jul. 1988, pp. 880–886.

*Primary Examiner*—Stephen S. Hong
*Assistant Examiner*—Robert Dale Bourque

[57] ABSTRACT

A method and apparatus for traversing a hypertext system is provided. A set of descriptive document index terms is provided for documents in the database. Means are provided for the user to specify both the set of relevant index term values and the weighted relative ranking of the set of index terms. Means are provided for comparing the set of index terms specified by the user with sets of document index terms. The comparisons result in a ranked list of the selectively linked electronic documents. In one aspect, the electronic documents are ranked in accordance with the relevancy of each document with respect to the user. In another aspect, each electronic document in that database is indirectly linked with the user's present position through intermediate, dynamically generated tree links. The intermediate tree links are generated in accordance with the relevancy of each document with respect to the user and the efficiency of each index term to differentiate between relevant documents.

20 Claims, 11 Drawing Sheets

FIG. 2C

| TERM | RELEVANT | RANK |
|---|---|---|
| SIZE | ☒ | 20 |
| TYPE | ☐ | — |
| LANGUAGE | ☒ | 50 |
| ⋮ | ⋮ | ⋮ |
| SUBJECT | ☐ | — |
| | | |

USER INTERFACE SYSTEM AND METHOD FOR BROWSING A HYPERTEXT DATABASE

This application is a continuation-in-part of application Ser. No. 08/517,136 filed Aug. 21, 1995, now abandoned.

FIELD OF THE INVENTION

The present invention generally relates to user interfaces for data storage and retrieval systems. The invention relates more specifically to a system and method for choosing and executing queries to such data storage and retrieval systems and traversing databases associated therewith.

BACKGROUND OF THE INVENTION

Many current data storage and retrieval systems are organized using a principle called "hypertext". As computer work stations and digital storage have grown cheaper, more powerful and more available, it has become increasingly more attractive to extend the traditional notion of "flat" text files that are organized hierarchically, by allowing more complex nonlinear organizations of material. In a hypertext system, each data entity, i.e. document or node, is connected to other documents in the system by pointers, or links. The human user of a hypertext system moves between documents by following the links. In this context, the process of moving between links is called "browsing."

Generally, hypertext database systems provide a mechanism to traverse from node to node using the links. As noted in J. Conklin, "Hypertext: An Introduction and Survey", COMPUTER, September 1987, pages 17–41, to qualify as hypertext, ideally a system should require a user to use no more than a few keystrokes or mouse operations to follow a single link. The links provided by the interface transport the user quickly and easily to a new place in the hypertext system.

Although hypertext systems presently enable a user to traverse efficiently between nodes using links, once he or she determines the desired links to be utilized, the number of documents in a hypertext system may be very large. Consequently, the number of links connected to any document may also become very large. This leads to difficulties in "navigating" through the database. The large number of links from each document often confuses the user when the user is attempting to select which link to follow.

One approach to this problem is providing an overview display or "map" of the hypertext documents and links. This approach has the disadvantage of creating a large and complex map display when the number of documents and links is large. As a result, further control and display options are needed, which the user must learn. Another disadvantage is that the user expends time in manipulating the map, rather than more effective use of the user's time, such as reading documents.

Another approach to this navigational dilemma is to apply standard database search and query techniques for locating documents that the user is seeking. This involves addressing entities by content. For example, entities are addressed using text or numbers that are stored in association with the entity, in addition to or rather than a user-assigned name or symbol. This is usually executed by applying some combination, using Boolean operations of keyword and full string search and predicates on other attributes (such as author, time of creation, type, etc.) of nodes or links.

Various languages exist for querying structured databases or text retrieval systems (for example, DIALOG, SQL). All of these languages share the drawbacks of being arbitrary and complex. These drawbacks cause problems in applications where untrained users must query a data storage system, or in educational and training uses, in which it is inappropriate to presume that users have prior training in the query method.

Further, textual query methods are subject to tradeoffs between precision (the number of retrieved entities which are actually interesting) and recall (the fraction of total interesting entities which are actually found). Studies have found that, for instance, a typical query to a legal information system produces only 20% of those database entities that are actually relevant. See D.C. Blair et al., "An Evaluation of Retrieval Effectiveness for a Full Text Document Retrieval System", Communications Of The ACM, March 1985, Vol.28, No.3, pp. 289–299.

Other attempts to control the complexity of linking have concentrated on database-wide elision of sets of links. For instance, the Intermedia system allows the separation of links into sets called webs. Only one of these sets is visible to the user at a time. This achieves simplification but at the expense of possibly removing valuable links from consideration if those links are stored in the webs which are not loaded. See N. Yankelovicli, et al., "Intermedia: The Concept and the Construction of a Seamless Information Environment", COMPUTER, January 1988, pp. 81–96.)

Another approach to elision is filtering. In this context, filtering refers to database-wide selection of documents and links based on a query, in a fashion similar to that described above. For example, see J. Remde et al., "Super Book: An automatic tool for information exploration-hypertext?", Bell Communications Research, Hypertext '87 Papers, November 1987, pp. 175–188; and "Searching for Information in a Hypertext Medical Handbook", Communications Of The ACM, July 1988, pp. 880–886. In such systems, the pattern of links is also considered in the decision to remove entities from the user's view. However, because such filtering methods treat the entire database at once, they share the limit of precision-recall tradeoff as described above, meaning that they achieve reduction of complexity at the expense of loss of information.

For example, suppose a user is a native speaker of German but also knows some English and French. In a filtering approach, the user might specify "German" as a filter. The database would filter out all documents not in German. The user would be unable to consider English or French documents even if such documents were highly relevant for other reasons.

U.S. Pat. No. 5,408,655 (Oren) provides a method for a user to rank the relevancy of each document and thereby reduce and order the choice of links which may be traversed from a particular node while browsing a hypertext. In Oren, a database of documents is indexed according to the content of the documents in the database. The index terms of Oren are content-based. Unlike the strategy of total elision of some classes of links, Oren leaves all links intact for potential use by either the user or the criterion evaluation process. However, this method depends on the user to reduce and order the links. The approach of Oren breaks down if the user's ranking results in a large number of similarly relevant documents.

With the growing use of multimedia databases containing not only textual documents, but also data entities containing sound and graphics, and the growing utilization of hypertext-type nodal networks within these multimedia databases, the requirement for effective and meaningful navigation has become even more imperative.

Utilization of a hypertext-type nodal network in conjunction with a multimedia database may be described as a "hypermedia database". Thus, in this context, the term "hypermedia system" refers broadly to a database which may be constructed to include documents or nodes and machine supported selected linkages or pointers that provide the user with the ability to efficiently travel from one node to another. These nodes may include text, sound, or graphic material. An example of a system that supports hypermedia is the World Wide Web (called, in shorthand, WWW, W3, or the Web). The Web is a system available using a global packet-switched network (the Internet) that allows traversal through a hypertext-type nodal network containing text, sound and graphics. The Web provides a machine-supported ability to selectively traverse in an automatic fashion using linkages. Items are selectively linked to each other in the nodal network. The set of all documents available using the World Wide Web is an example of a hypertext database.

The foregoing problems are acute in the context of the World Wide Web. Locating Web documents is a well-known problem. The Web is presently known to comprise millions of documents. In past approaches, Web documents have been located in two ways: by explicitly requesting a particular Web document using its uniform resource location (URL) identifier; or by submitting a query to a search engine. Several search engines are presently available, including Yahoo!, Excite, Lycos, InfoSeek, and AltaVista. In the search engines, the set of searchable Web documents is an example of a hypertext database.

To locate a Web document or site using a search engine, a user formulates a query using one or more keywords. The search engine has an internal index that indexes every significant word within all documents available to the search engine. Thus, the index is said to be a content-based index, because it is derived from the contents of the Web pages that are available to the search engine. The user provides a keyword query or a set of keywords to the search engine. When the search engine receives the user keyword query, the search engine looks up each keyword in the index, and assembles a list of documents that contain the keywords of the query.

In some search engines, the resulting list is presented to the user seemingly in random order. To locate a relevant document, the user must tediously traverse to or read each document in the list and determine whether it is relevant based upon its actual contents. In other search engines, such as AltaVista, the resulting list is presented to the user purportedly in order of the relevance of each document to the search query. In such search engines, the relevance of a document is determined using heuristic information, for example, by the number of times that a keyword appears in the content of the document, or by the number of all the keywords that appear in the content of the document. However, such heuristic information does not always accurately reflect the true relevance of a document to the user's query. The user is required to determine the relevancy of a document.

Another search method is filtering. The user specifies filtering parameters and the database is filtered based on the parameters to arrive at a set of relevant items. The user manually determines which item in the set of relevant items is the most relevant.

Based on the foregoing, there is a clear need in this field for a system and method for a hypertext system or hypermedia that can to reduce and order the set of relevant links. There is also a need for a system that can incorporate expert historical knowledge of past relevance to determine present relevance of documents.

Another need is to reduce the elapsed user time for traversing the database. Still another need is to allow the user to control the tradeoff between complexity and the number of intermediate links to the relevant documents.

Other needs and objects will become apparent from a consideration of the ensuing description and drawings.

SUMMARY OF THE INVENTION

In one aspect, the invention provides a method for a user of a computer system to traverse a hypertext database to retrieve an electronic document stored in the hypertext database, comprising the steps of (A) storing in the hypertext database a plurality of hypertext nodes, each of the hypertext nodes corresponding to an electronic document, wherein each of the hypertext nodes may be selectively linked to another of the hypertext nodes; (B) storing an index in association with the hypertext database, the index comprising a plurality of descriptive index terms, in which each of the descriptive index terms is assigned to one of the electronic documents; (C) receiving a weighted relevancy ranking of each descriptive index term; (D) receiving a set of relevant index term values; (E) comparing the set of relevant index term values with sets of the descriptive index terms using the weighted relevancy ranking and the set of relevant index term values; (F) producing a list of electronic documents based on the comparing step (E), in which the list is ranked in accordance with the relevancy of each document with respect to the user based on the weighted relevancy ranking and in which each document in the list contains at least one of the relevant index term values.

One feature of this aspect is that step (C) further includes the step of receiving a weighted relevancy ranking that is combined with a historical weighted relevancy ranking, and step (E) further includes the step of for the purpose of comparing the set of relevant index term values with sets of the descriptive index terms using the weighted relevancy ranking, the set of relevant index term values, and the historical weighted relevancy ranking.

Another feature involves the step of receiving a historical weighted average relevancy rank value for each of the descriptive index terms, and in which step (C) comprises the step of setting a weighted relevancy ranking of each descriptive index term equal to the historical weighted average relevancy rank value for that descriptive index term. Still another feature is the step of linking the ranked list of electronic documents to an intermediate tree, in which the intermediate tree is linked to the user's position within the hypertext database.

Yet another feature is the step of linking each electronic document in the hypertext database to a present position of the user in the hypertext database by an intermediate, dynamically generated tree link. Another feature is the step of generating each intermediate, dynamically generated tree link in accordance with relevance to the user of the document to which the tree link is linked and in accordance with efficiency of each index term to differentiate between relevant documents. Another feature is the step of computing relevance to the user of the document to which the tree link as a function of the set of index terms and the weighted relevancy ranking of the index terms.

In another feature, the method further includes the step of computing efficiency of each index term from the distribution of the index term in the documents. Another feature involves the step of indexing the hypertext database includes the step of assigning a efficiency value to each index term, in which the efficiency value is a numerical indication of how well each descriptive index term differentiates the tree links.

According to another feature, step (F) further includes the step of ranking the documents based on a weighted combination of the user relevancy ranking of each descriptive index term and the efficiency value of each descriptive index term. Another feature relates to receiving from the user a limit value that identifies a maximum breadth of a tree of the tree links and thereby limits browsing complexity. In still another feature, the method further includes the step of applying a hashing formula that uses the index terms, to minimize a depth of the tree based upon the limit value, and to thereby balance the tree.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2C is a diagram of a data structure that is used, in one embodiment, to store information about the relevancy and the weighted relevancy rank of index terms.

DETAILED DESCRIPTION OF THE PREFERRED EMBODIMENT

A method and apparatus for browsing a hypertext database is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HYPERTEXT DATABASE SYSTEM

As will be disclosed below, an aspect of a preferred embodiment involves a process for controlling, browsing, selecting, ordering and displaying a subset of the possible links from a document, resulting in reduced user confusion while browsing through a hypermedia system. The user's goal for traversing the system is to minimize the elapsed time for the user to find the relevant document. The elapsed time is a function of the number of links from the user's position to the relevant document and the number of decisions that the user needs to make to reach the relevant document. The more decisions the user has to make, the more time the user must take to make decisions and correct for errors.

Figure 1A:
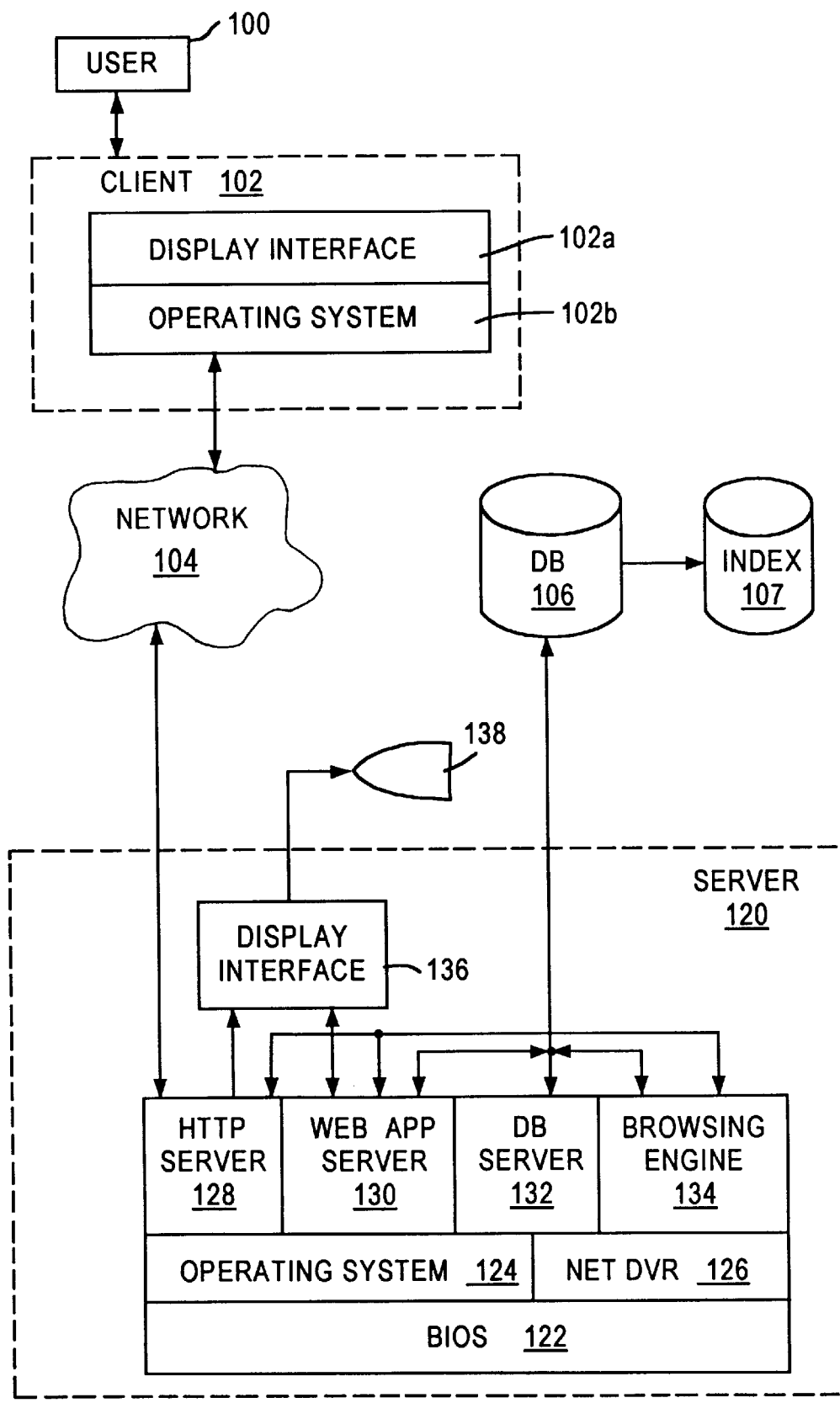
FIG. 1A is a diagram of a hypertext browsing system.

FIG. 1A is a diagram of a hypertext system. A user 100 operates a client 102, which comprises a general-purpose computer system. The client 102 runs a display interface 102a and an operating system 102b. In one embodiment, the display interface 102a is an application program that can display hypertext documents, such as a World Wide Web browser program. Examples of browsers are HotJava, Netscape Navigator and Microsoft Internet Explorer. The operating system 102b controls operation of the display interface 102a, and other application programs, and coordinates their interaction with hardware elements of the client. Examples of operating systems are SunSoft Solaris, Apple MacOS, and Microsoft Windows.

For example, the client 102 runs a basic input/output system (BIOS), a windowed operating system such as Microsoft Windows, and a World Wide Web browser program.

The client 102 is coupled to a network 104 for communication to internal or external resources. For example, the network 104 is the global, packet-switched network known as the Internet. In another example, the network 104 is a local area network.

A server 120 is also coupled to the network 104. Generally, the server 120 is a general-purpose computer system that can receive requests for resources stored on the server or accessible to the server, and deliver the resources to a requesting client 102. The server executes a basic input/output system or BIOS 122. The BIOS 122 is responsible for managing and coordinating interaction of upper level software elements with basic functions of the server 120 and hardware elements of the server. An example of a BIOS 122 is the Phoenix ROM BIOS.

An operating system 124 is logically located atop the BIOS 122 and executed by the server 120. The operating system 124 is a server-class operating system such as Microsoft Windows® NT or Solaris. Optionally, the operating system 124 executes in cooperation with a network driver program 126 that functions to coordinate interaction of the operating system and the network 104. An example of the network driver program 126 is an IPX driver.

Application programs are executed by the server 120 at a logical level atop the operating system 124. In the preferred embodiment, the application programs comprise an HTTP server 128, a Web application server 130, a database server 132, and a browsing engine 134. The HTTP server 128 is an application program that sends, receives, formats and decodes requests and messages communicated between the network 104 and the server 120 that are formatted in the Hypertext Transfer Protocol. HTTP is a well-known protocol, the details of which are omitted here so as not to obscure the invention. An example of the HTTP server is the public domain Apache server that runs under the UNIX operating system.

The Web application server 130 is an application program that receives information from one or more other application programs or databases, formats the information under program control into one or more files that are formatted in the Hypertext Markup Language (HTML), and delivers the formatted files to one or more other application programs. An example of a Web application server is Apple WebObjects or NetObjects Fusion. The Web application server 130 may be integrated into the HTTP server 128. An example of a suitable product that is integrated in this manner is Microsoft Internet Information Server.

The database server 132 is an application program that interacts with a database 106. Generally, the functions of the database server 132 are to receive requests for information directed to the database 106, format the requests into queries that are understood by the database, submit the requests to the database, receive one or more results from the database, format the results, and deliver the formatted results to one or more other application programs. For example, the database server 132 may receive a request for information in the database in the form of a Structured Query Language (SQL) statement that identifies one or more tables in the database. The database server 132 verifies that the SQL statement has correct syntax and identifies information that is actually in the database 106. The database server 132 submits the SQL statement to the database 106 and receives a result set of records from one or more database tables.

The browsing engine 134 is an application program that interacts with the other application programs to carry out a method of browsing a hypertext system in the manner described further herein. Generally, the browsing engine 134 establishes one or more connections with one or more clients, presents a view of hypertext documents in the database 106 to the clients, receives information that identifies which documents in the database are relevant to the clients, creates a ranked list of the documents based upon the relevance information, and provides the ranked list to the clients. Other functions of the browsing engine 134 will become apparent from the description herein.

Preferably, the database 106 is indexed by an index 107.

Figure 1B:
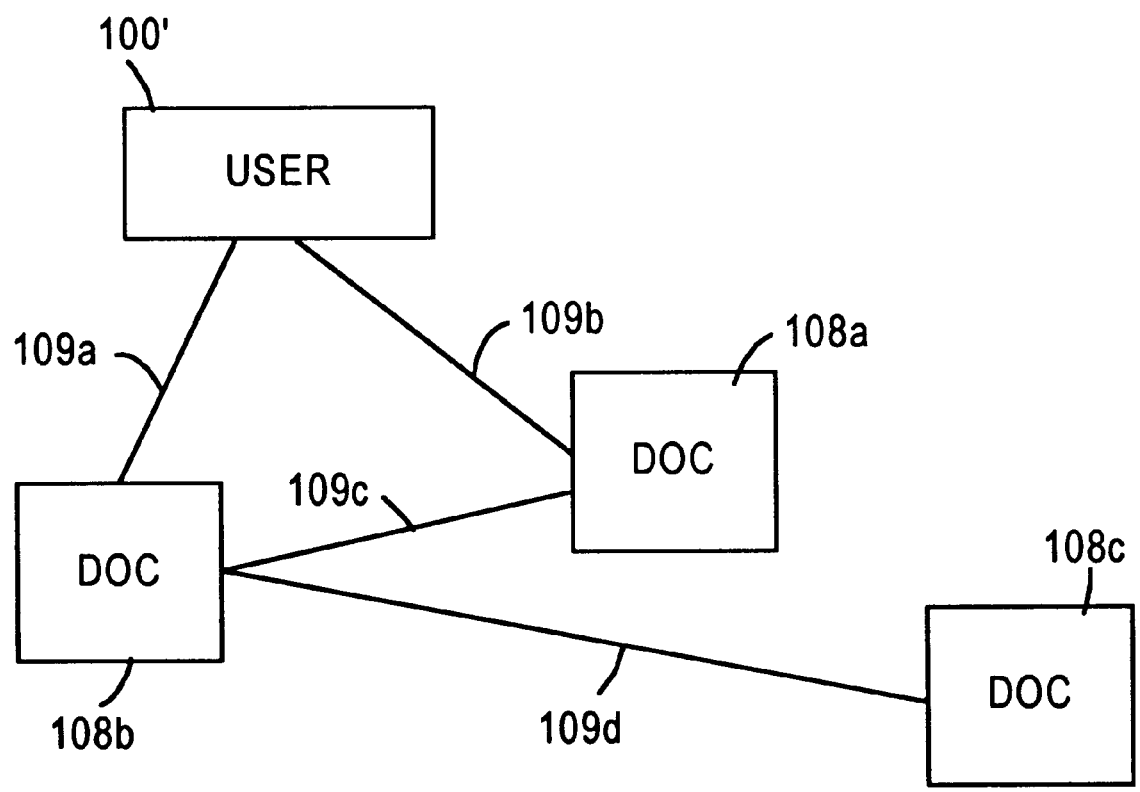
FIG. 1B is a diagram of a hypertext document database.
Figure 1C:
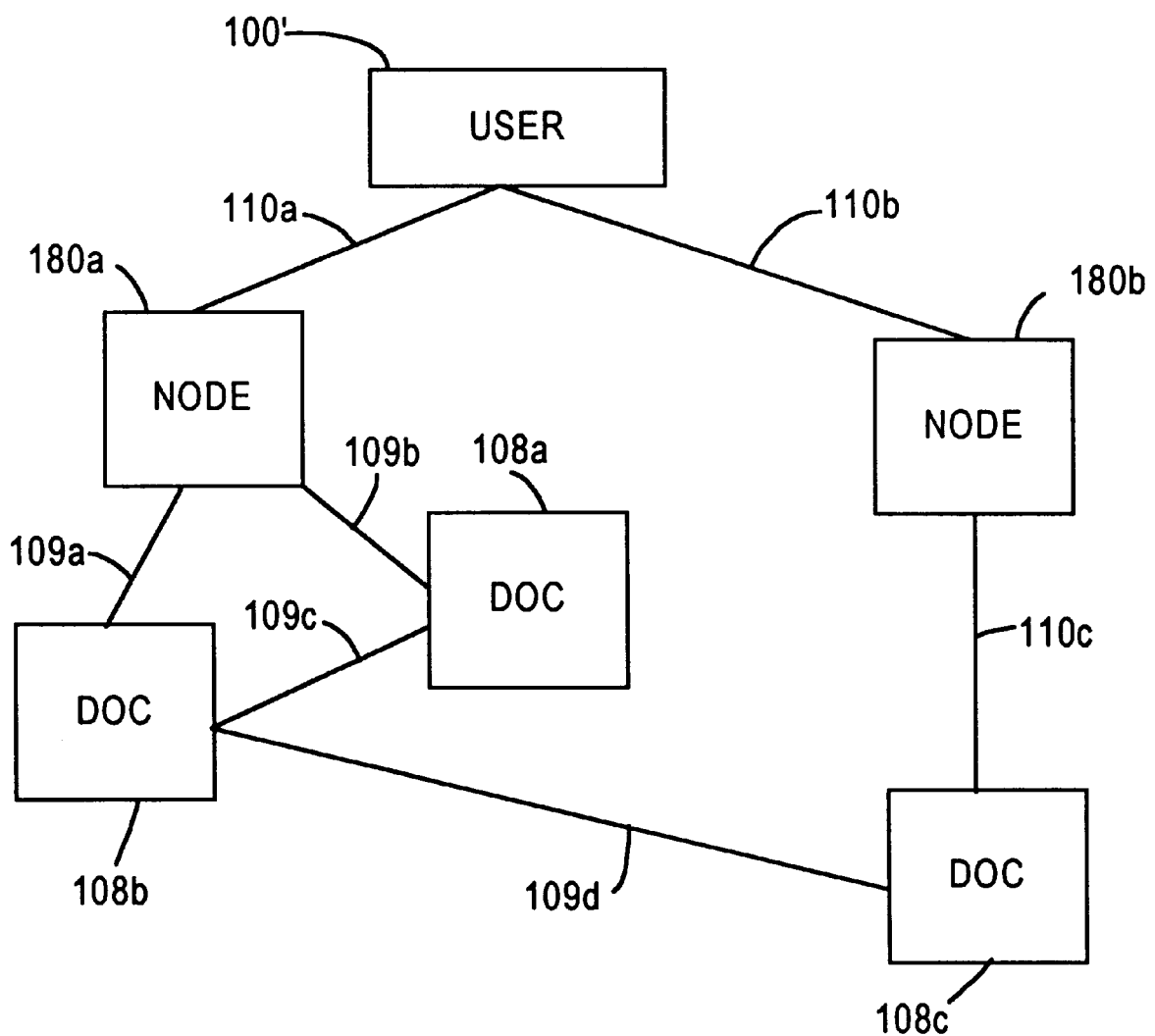
FIG. 1C is a diagram of a hypertext document database with intermediate tree links.

FIG. 1B is a diagram of the contents of the database 106. In the preferred embodiment, the database 106 comprises a plurality of documents 108a–108c that are interconnected by one or more references or links 109a, 109b. Preferably, the links 109a, 109b organize the documents 108a–108c in a multi-way tree structure, and are created at the time that the database 106 is created. As documents are added to the database, additional links 109a, 109b are created to connect the new documents to existing documents. The logical position of the user 100' is also linked to the documents. The hypertext system 106 comprises any number of documents, links, and intermediate links; the three documents 108a–108c shown in FIG. 1B are illustrated only by way of example. Further, any number of links 109a, 109b may be used. The finite number of links shown in FIG. 1B are illustrated only as an example.

In an embodiment, each link 109a, 109b is a reference to one of the documents 108a–108c. For example, the database 106 is the World Wide Web, each of the documents 108a–108c is a Web document prepared in HTML, and each link 109a, 109b is an HTML anchor that references another Web document. Alternatively, each link 109a, 109b is a reference to a position within the same document 108a that contains the link.

In this configuration, the client 102 can navigate among documents in the database 106 by selecting one of the links 109a, 109b. In one embodiment, the user 100 activates the client 102 and connects it to the browsing engine 134 through the network 104 and one or more application programs, such as the HTTP server 128. For example, the user 100 causes the client 102 to open an HTTP connection to a pre-determined Uniform Resource Locator (URL) that identifies a Common Gateway Interface (CGI) script or other method of accessing the browsing engine 134 over the Web. In response, the browsing engine 134 issues a query to the database server 132 that requests information about all the documents in the database 106. The database server 132 interrogates the database 106, creates a result set, and forwards the result set to the browsing engine 134. The browsing engine 134 formats the result set into a ranked it points to an initial document among the documents 108a–108c. The browser of the client 102 displays the document in such a way that any links within the document are highlighted. The user 100 selects one of the links using the client 102, for example, by moving a cursor generated by the client using a mouse or other pointing device coupled to the client. In response, the hypertext system 106 locates another document among the documents 108a–108c that is referenced by the selected link. The hypertext system 106 directs the client 102 to the referenced document, or redirects the client to the referenced document. The client continues the foregoing browsing process until the user ends the browsing session.

Figure 2A:
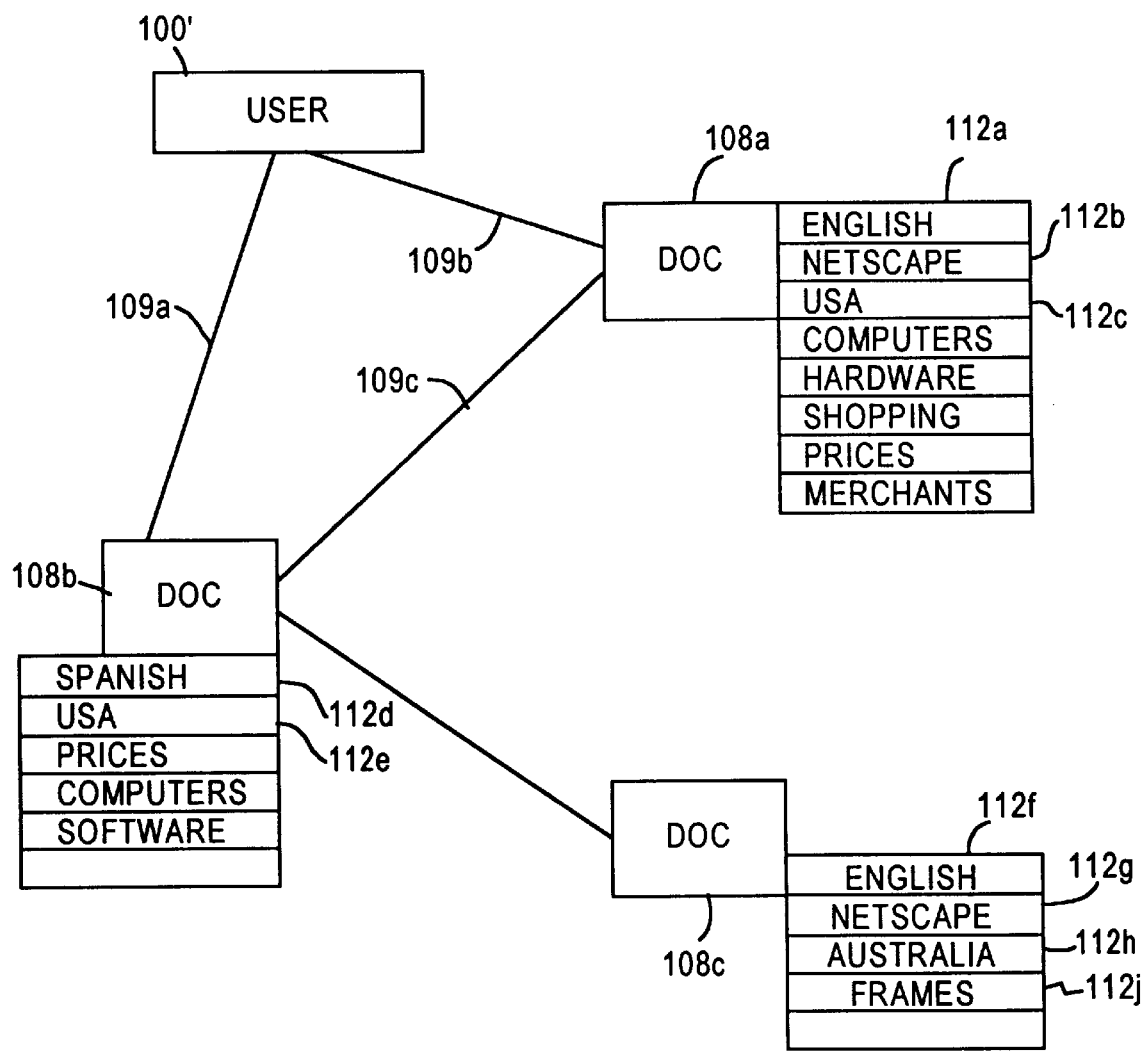
FIG. 2A is a diagram of a hypertext document database in which documents are tagged with index terms.

FIG. 2 is a diagram of the hypertext document system 106 in which each document 108a–108c is tagged with one or more descriptive document index terms 112a–112h. The document index terms characterize the electronic documents in the hypertext document or hypertext-type database that is selectively linked in that database with the user's present position. The term "hypertext-type database", as used herein, may refer to either a hypertext database or a hypermedia database. Thus, in an embodiment, each index term 112a–112h is a metadata value that describes an aspect of the form or content of the document to which the tag is attached. Examples of index terms include information identifying the popularity of a document, its size, its publisher, its server location or geographic region, the type of content in the document, or its language.

For example, the index terms 112a–112c that are attached to the first document 108a indicate that the document has been prepared in the English language, and is about computers, hardware, shopping, prices, and merchants. The index terms 112d–112e that are attached to the second document 108b indicate that the second document is prepared in the Spanish language and is intended to be used in the USA. the index term 112d ("Spanish") is an example of an index term that references the language of a document. The index term 112e ("USA") is an example of an index term that references an intended region associated with a document. Other index terms can describe a browser, or its characteristics, which are preferred for use in displaying the document. For example, the index terms 112f–112j that are attached to a third document 108c are "English", "Netscape 4.0," "Australia," and "Frames". These index terms indicate that the third document is prepared in English, is best viewed using the Netscape browser release 4.0, is intended for an audience in Australia, and is best viewed using a browser that supports HTML frames.

In the preferred embodiment, a user of the hypertext system selects a set of relevant index terms from among the index terms associated with documents in the hypertext system. The user also specifies a weighted relative ranking of the index terms. Thus, the user specifies preferences for what document characteristics are important to the user, rather than explicit content that is required to be in a relevant document.

For example, when the user is searching for particular document in a keyword searching system such as the Yahoo! search engine, the user explicitly specifies an author's name, title, or subject of the document. The search engine stores a fixed representation of all the documents known to the search engine. The fixed representation can be viewed as a single fixed tree that logically represents searchable Web documents. The search engine looks up the specified keywords in the fixed representation. Every user searches the same fixed representation on every visit or use to the search engine.

In contrast, in the preferred embodiment, the author's name, title, and subject of the document are index terms. The user specifies which of the index terms are more important to the user, and provides the relative weight or importance of each index term. The system dynamically constructs a tree that represents the documents ordered or ranked according to the relevance information provided by the user. The system presents a list of the documents ranked according to the information provided by the user. This substantially reduces search time. Each user essentially searches a customized tree that is based on the user's preferences. Content-based searching is avoided.

The set of relevant index terms, and the weighted relative ranking, are stored in association with the hypertext system. FIG. 2C is a diagram of an exemplary data structure 228 that is used to store the set of relevant index terms and the weighted relative rankings. The data structure 228 is organized as a table that provides a mapping of index terms, whether each index term is in the set of selected index terms, and weighted relative rankings.

A term column 230 stores index term values. Preferably, the term column 230 stores a list of all index term values that are available in the hypertext system. Examples of the index term values stored in the term column 230 are a "size" value 236 and a "type" value 242. Other examples of index terms include "popularity" (signifying information that indicates the popularity of a document), "publisher", "location", "region", and "language".

A relevancy column 232 stores information indicating whether each index term value in the term column 230 is relevant to the user. The information in the relevancy column 232 may be a Boolean value, a yes/no value, etc. In an embodiment, as shown in FIG. 2C, when the information in the relevancy column 232 is displayed to a user, the state of the information appears in the form of a check-box that may be checked or unchecked.

A rank column 234 stores a value that is a weighted relevancy ranking of a particular index term that is stored in the term column 230 and indicated to be relevant in the relevance column 232. For example, as shown in FIG. 2C, a user may specify that the "size" term 236 is a rank value 240 of "20". When an index term such as the "type" term 242 has an unchecked box 244 in the relevance column 232, the corresponding rank value 236 is null or undefined. The rank values in the rank column 234 are non-unique; any number of the rank values may be the same. In an alternate embodiment, all the rank values are initialized to a value of "1" when the hypertext system is started.

METHOD OF BROWSING

Figure 3A:
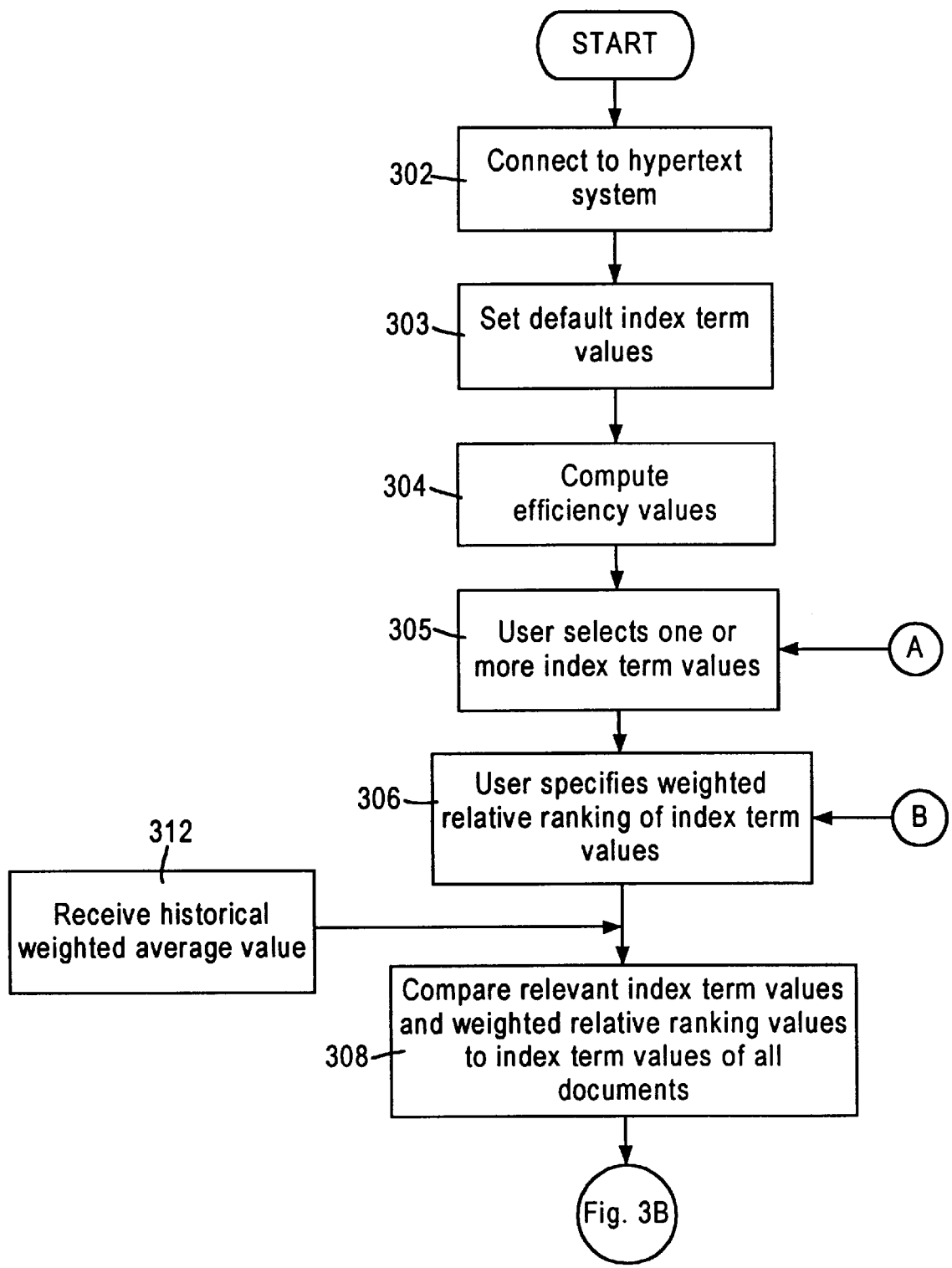
FIG. 3A is a flow diagram of certain steps in a method of traversing a hypertext system.
Figure 3B:
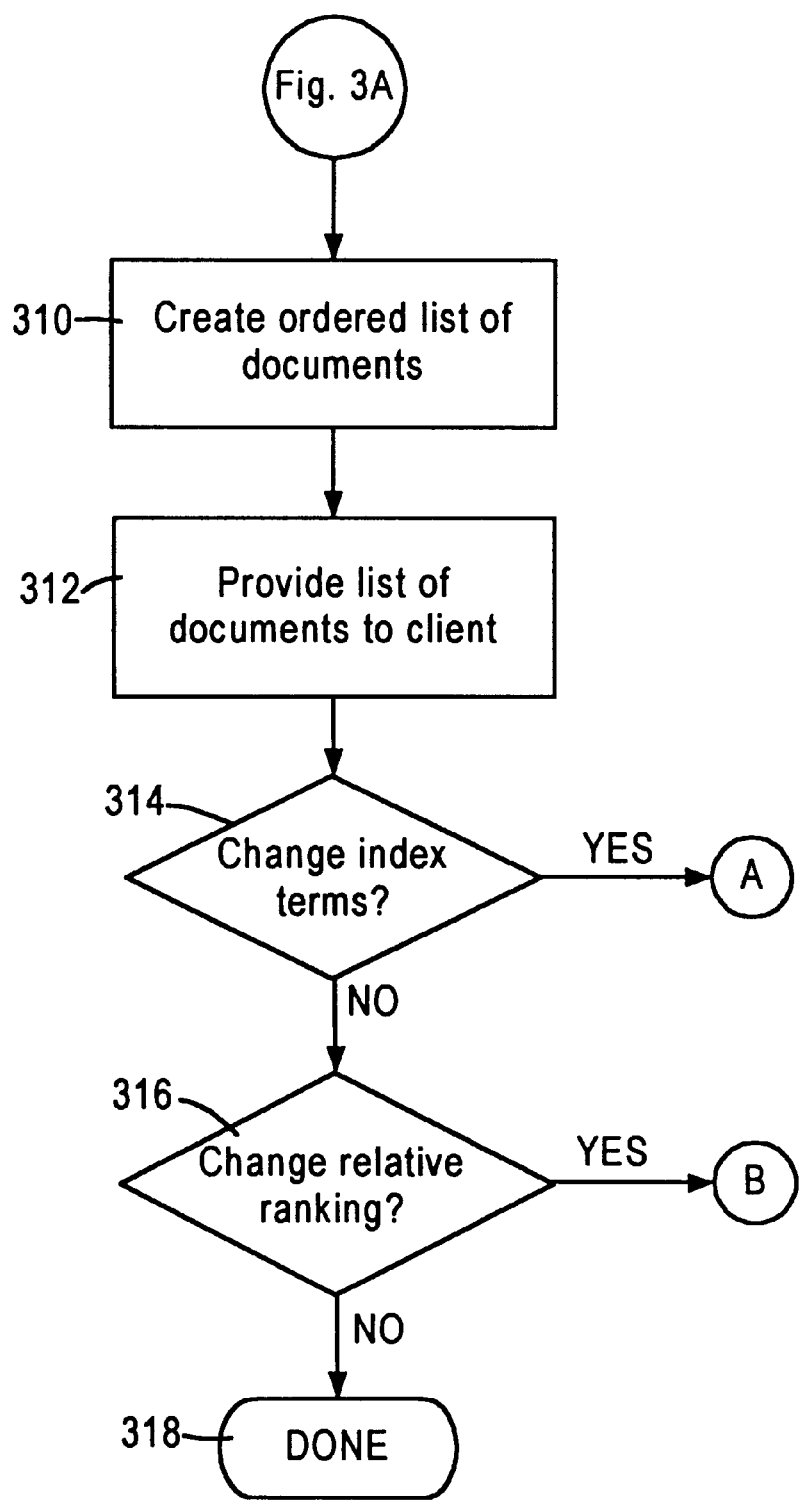
FIG. 3B is a flow diagram of steps in the method of FIG. 3A.

FIG. 3 is a flow diagram of a method of browsing documents in a hypertext system. The method of FIG. 3 presumes that a hypertext system is provided, and a user desires to locate a particular document in the hypertext system, or a set of documents that are relevant to a specific interest of the user. The criteria by which the user selects one or more documents, in this context, are called query criteria.

In step 302, a client connects to a hypertext system. In the preferred embodiment, step 302 involves opening an HTTP connection from a client 102 that runs a browser application program to a server that stores the hypertext system 106. The browser requests the hypertext system 106 to provide a list of the documents 108a–108c that form the hypertext system. The hypertext system 106 delivers an unsorted list of the documents 108a–108c to the client 102. The browser displays the unsorted list on a display of the client 102.

In step 304, the system computes an efficiency value for each of the documents in the hypertext system, and stores the efficiency value in association with information about the document. The computation involved in this step, and use of efficiency values, is discussed further herein.

In step 305, a user of the hypertext system selects one or more of the index terms that are relevant to the user's query criteria. In the preferred embodiment, a user provides input to a computer system that is running a hypertext display program. The user input indicates which of the index terms recognized by the system are most relevant to the user's query criteria. For example, hypertext display program displays a list of generic index terms, such as "LANGUAGE," "REGION," "BROWSER," etc. The user clicks on one or more of the generic index terms to indicate that the selected terms are more relevant to the user's query criteria than non-selected terms. In this context, when the user clicks on the "LANGUAGE" generic index term, the user is communicating the concept, "the language of the documents in the database is more important to me than its other characteristics." As another example, in an embodiment, a user may specify that the title of a document is more important its subject, or that the date of a document is more important than its subject.

Step 304 is an optional step. In an embodiment, a user may browse the hypertext database without specifying any index terms as relevant.

In step 306, the user specifies a weighted relative ranking of the index terms that were selected in step 304. In the preferred embodiment, the user provides input to the computer system that is running the hypertext display program. The user input indicates the order of relevance of the selected index terms. For example, in a case in which the user has selected "BROWSER," LANGUAGE," "REGION" as the selected index terms, the user may enter values that signify the relative importance, to the user, of the selected index terms. As an example, the user may enter "1", "2", and "3" as the relative importance of the index terms "BROWSER," "LANGUAGE," and "REGION." The use of integers to label or signify relative importance is not required; in alternate embodiments, the user graphically orders the terms by dragging and dropping them in a palette, or specifies that one term is, for example, 50% more relevant than another term.

Thus, a preferred embodiment includes means for the user to specify both the set of relevant index term values and the weighted relative ranking of the set of index terms. The weighted relative ranking of the set of index terms is unique to the preferred embodiment. It allows the further reduction and ordering of the relevant set of documents by providing another relevancy selection key.

In step 308, the index term values selected by the user in step 304, and the weighted relative ranking values provided by the user in step 306, are compared to index term values of the documents 108a–108c of the hypertext system 106. For example, in the preferred embodiment, an index comprising all the index term values is created and sorted using a two-phase sort that uses the selected index term values and the weighted relative ranking values as sort keys. Thus, a preferred embodiment includes means for comparing the set of index terms specified by the user with sets of document index terms.

If the user fails to identify any index terms as relevant, that is, the user skips step 304, then the comparison step is carried out based upon other criteria. For example, the comparison operation constructs a tree of selected documents based upon information that identifies the client 102 or the user of the system. Consider a system in which the hypertext database is the World Wide Web and the user 100 browses using a Web browser program at the client 102. Each browser request for a document in the database contains information that identifies the client, such as the manufacturer and version of the browser currently in use, whether the browser supports HTML frames, the client's native language or geographic region, etc. The browsing engine extracts the client identifying information from the browser request and uses it to construct a tree of relevant documents.

The comparisons result in a ranked list of the selectively linked electronic documents. As shown in step 310, an ordered list of the documents is created. In one embodiment, ordered lists shows the electronic documents ranked in accordance with the relevancy of each document with respect to the user. The relevancy ranking is determined based on the index term values selected by the user in step 304, and the weighted relative ranking of index term values provided by the user in step 306.

Consider an example in which the user specifies in steps 304–306 that the language of a document is the most important index term, and the database includes only the documents shown in FIG. 2. At step 310, the ranked list comprise documents 108a, 108c, which are English language documents, ranked as having a priority greater than document 108b, which is prepared in Spanish.

The relevancy ranking simplifies the decisions that the user must make because the user can concentrate on the most relevant links first. The user is therefore enabled to efficiently retrieve relevant documents in accordance with his selected set of index terms and weighted relevancy ranking of index terms.

As shown in step 312, in an alternate embodiment, a historical weighted average value is received. The historical weighted average value may be received alternatively, or as a default that is assigned depending upon whether the user specifies a weighted relative ranking of index term values in step 306. For example, if the user does not specify an explicit weighted relevancy rank for an index term in step 306, the weighted relevancy rank is assigned to a default value of its historical weighted average value.

The preferred embodiment has the expert ability to "learn" over time by updating the historical weighted average relevancy rank of each descriptive index term. In the preferred embodiment, a historical weighted average relevancy rank value is defined for each of the index terms by constructing a decision tree that reflects past document browsing decisions of the user.

USER INTERFACE

Figure 4:
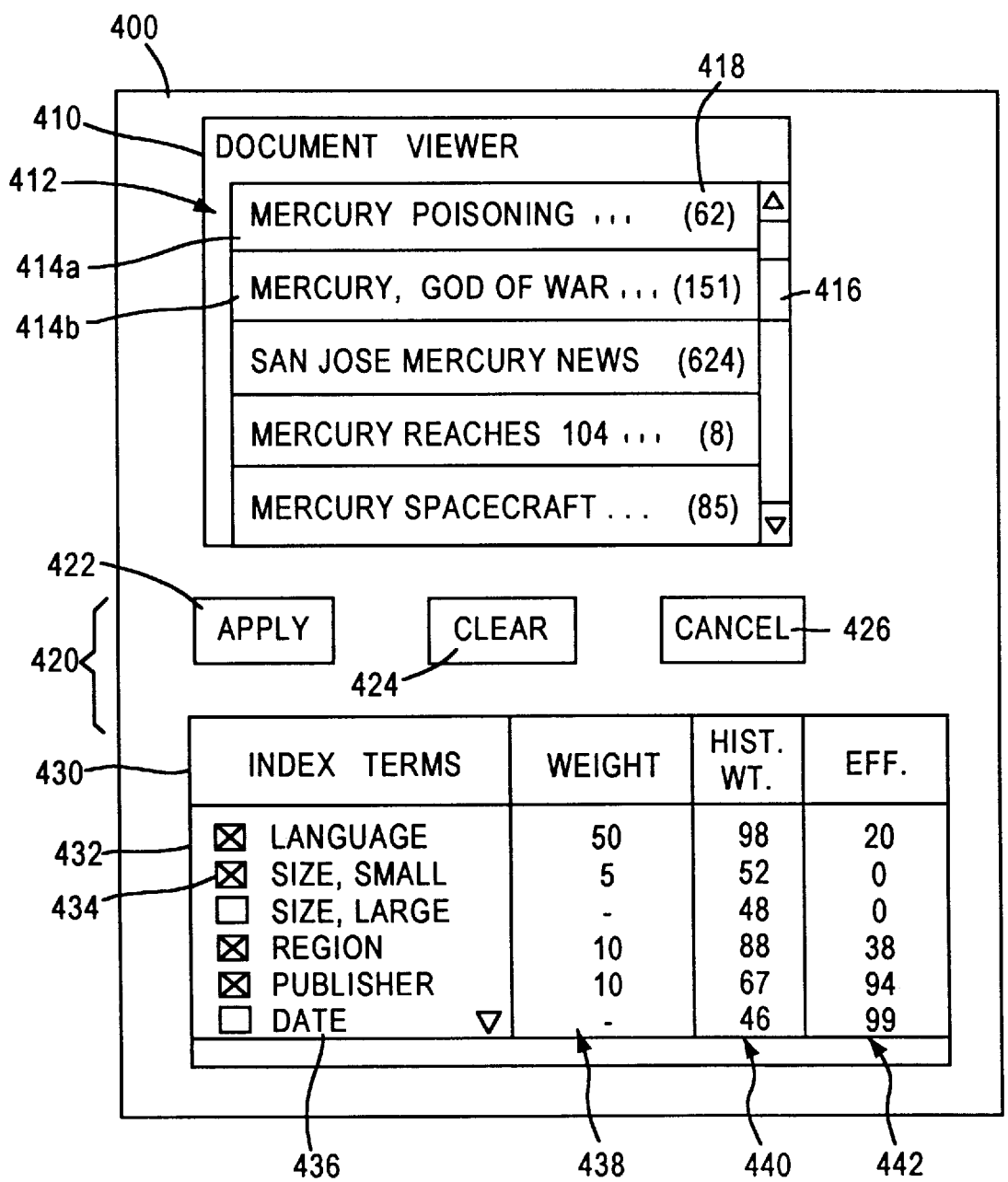
FIG. 4 is a diagram of a user interface for a hypertext browsing system.

FIG. 4 is a diagram of a user interface display 400 generated by the browsing engine 134 in a preferred embodiment. The display 400 comprises a document viewer pane 410, buttons 420, and a relevance information panel 430. The document viewer pane 410 comprises a document list 412 comprising a set of one-line document titles or names 414a, 414b. The document list 412 may contain a large number of document names 414a, 414b that overflow the display space available in the document viewer pane 410. In that case, the browsing engine 134 displays a scroll bar 416 of the type commonly available in operating systems that are based upon a graphical user interface (GUI).

Each document name 414a, 414b is a brief title or description of one of the documents 108a–108c that are in the hypertext database 106. In an embodiment in which the database 106 is the World Wide Web, and the documents 108a–108c are Web documents prepared in HTML, then the document name 414a, 414b is the document title identified in the documents using the <title> HTML tag.

A child node count 418 is displayed in association with each of the document names 414a, 414b. The child node count 418 is a numeric value equal to the number of child nodes, in the tree of documents in the hypertext database, that are child nodes of the document identified by the document name 414a, 414b associated with the child node count. The child node count 418 provides the user with additional information about the database 106 by indicating the number of other documents that are likely to be associated with a particular document. This enables the user to make decisions about the relevance information specified in the relevance information pane 430.

The document list 412 is a ranked list. The order of the document names in the document list 412 is determined by the relevance of each document to the interests of the user. When the browsing engine 134 is started or initialized, the document list 412 appears in a default order. In one embodiment, the default order is random order. In another embodiment, the default order is the order used by the user in the immediately preceding session. In yet another embodiment, the default order is alphabetical order based upon the document names.

The buttons 420 comprise an Apply button 422, a Clear button 424, and a Cancel button 426. Each of the buttons 420 is a standard graphical user interface button that is generated by the browsing engine 134 through an appropriate call to a user interface library of the operating system 124. Each of the buttons 420 is linked to code or other functional elements of the browsing engine 134. The functional elements associated with the buttons 420 are activated when a user presses one of the buttons. Pressing the buttons is accomplished, for example, by using a pointing device such as a mouse to position a cursor that is generated by the operating system 124 over one of the buttons, and pressing or clicking a button on the mouse.

When the Apply button 422 is pressed, in response, the browsing engine 134 carries out the following steps. The browsing engine 134 reads the values that are entered in the relevance information pane 430. The browsing engine 134 uses the values to construct a tree data structure in memory that logically represents a ranking of the documents according to their relevance to the user as specified by the values. The browsing engine displays in the document viewer pane 410 a new document list 412 in which the documents are listed in the order specified by the tree.

The user may view a document listed in the document list 412 by double-clicking on its name 414a, 414b. In response, the browsing engine 134 launches an application that is appropriate to the type of document identified by the selected name 414a, 414b. For example, when the documents are Web documents, the browsing engine 134 launches a World Wide Web browser application program at the client 102, and provides it with a location identifier of the selected document. This causes the browser to display the selected document at the client.

When the Clear button 424 is pressed, the browsing engine 134 clears all entered values from the relevance information pane 430. This enables the user to reset the state of the relevance information pane 430 and enter new values.

When the Cancel button 426 is pressed, the browsing engine 134 terminates.

The relevance information pane 430 comprises an index term column 432, a Weight column 438, a Historical Weight column 440, and an Efficiency Value column 442. The index term column 432 displays a list of index term values 436 that are defined for documents in the database 106. Each index term value in the list of index term values 436 has a check box 434. The user instructs the browsing engine 134 that a particular index term value in the list of index term values 436 is relevant to the user's query by checking the check box 434 associated with that term.

The Weight column 438 lists weighted relevancy ranking values for each of the defined index term values in the index term value column 432. For each selected index term value, the user enters a numeric value that reflects the relative weight of that index term in relevance to the user. The Historical Weight column 440 lists historical weighted relevancy rankings of each index term value, based upon the user's past patterns of traversal through the database. The Efficiency Value column 442 lists an efficiency value for each of the index term values. The computation and use of the historical weighted relevancy rank values and the efficiency values are described elsewhere herein.

In an alternate embodiment, the Historical Weight column 440 and the Efficiency Value column 442 are hidden from the user and not included in the user interface display 440.

INTERMEDIATE TREE LINKS

In an alternate embodiment, each electronic document in the hypertext database is indirectly linked with the user's present position through intermediate, dynamically generated tree links. As shown in FIG. 1B, in this embodiment the hypertext database 106 has a tree comprising a plurality of intermediate, dynamically generated tree links 110a–110b that connect one or more of the documents 108a–108c in the hypertext database to intermediate nodes 180a, 180b.

The intermediate nodes 180a, 180b and intermediate links 110a–110b are created "on the fly" while the database 106 is being used in a browsing operation by a client 102, and based upon the traversal path taken by the client in browsing the database. Thus, the links 109a, 109b establish a basic logical structure for documents in the database 106, whereas the intermediate links 110a–110b reflect the browsing path of the client. As described further herein, the intermediate links thereby provide information about the historical relevance of particular documents in the database 106 with respect to the client 102. In this context, the term "intermediate tree" refers collectively to the intermediate links 110a–110b.

Figure 2B:
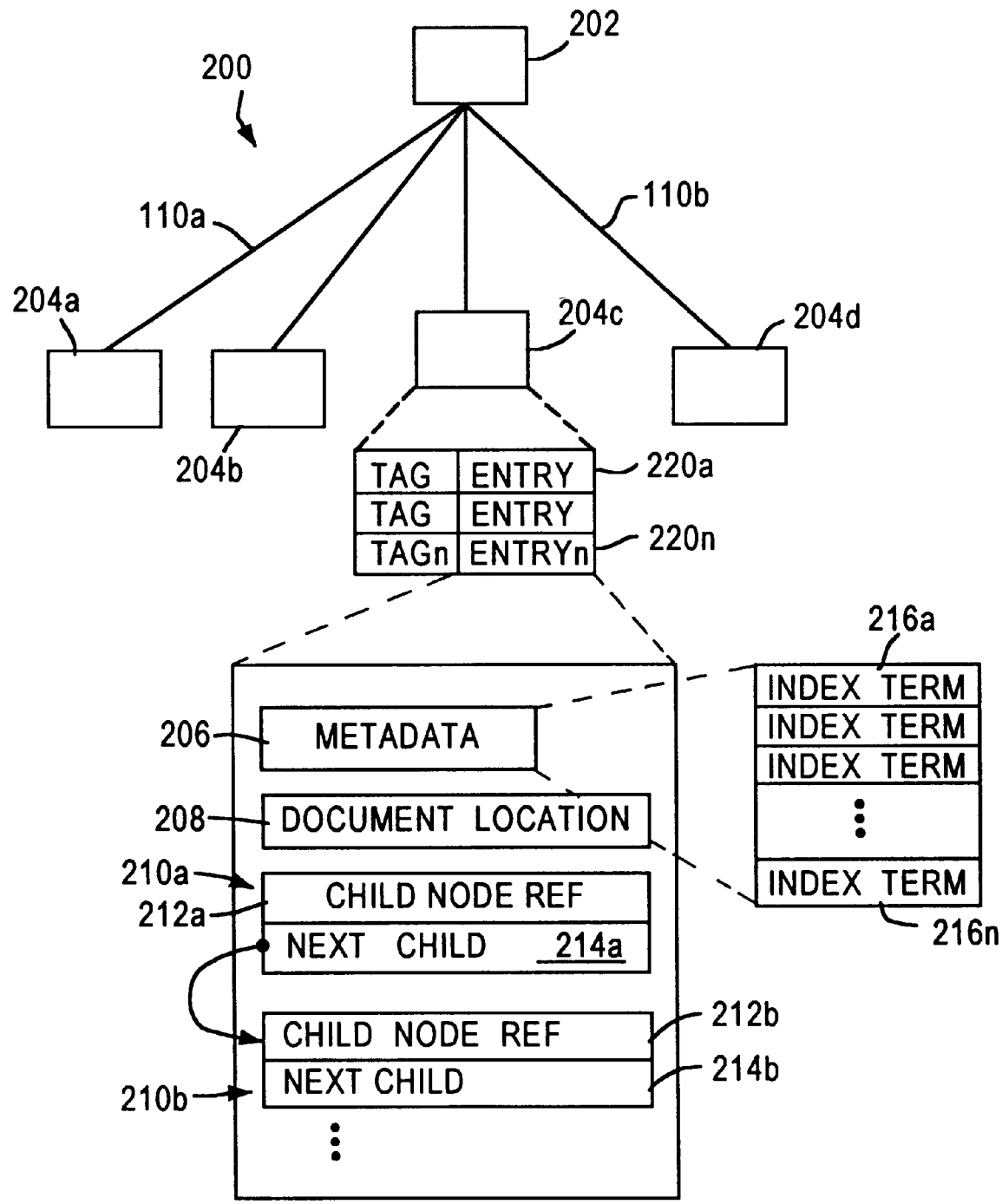
FIG. 2B is a diagram of a tree data structure that represents a hypertext document database.

Preferably, the intermediate tree and the overall logical structure of the database 106 each are balanced trees in which each node is a hash table. FIG. 2B is a diagram of a tree 200 of intermediate tree links 110a–110b that connect a root node 202 to intermediate nodes 204a–204d. The root node 202 may be a logical representation of the user's position 100', or the root node 202 may represent another child node within the tree 200.

Each child node 204a–204d is organized as a hash table, as shown in FIG. 2B in the cause of the child node 204c. The hash table comprises tags and entries 220a–220n that are stored in one or more buckets. Each index term is associated with a bucket. Each tag is an index term value. For example, a child node has a hash table having buckets named AUTHOR, TITLE, SUBJECT, DATE, LANGUAGE, and REGION. The LANGUAGE bucket has tag values of ENGLISH, ITALIAN, MANDARIN.

Each entry 220a–220n comprises metadata 206, a document location identifier 208, and one or more child node identifiers 210a, 210b. The metadata 206 comprises a set of index term values 216a–216n that are associated with a particular document in the database 106. The document location identifier 208 specifies where a particular document is located in the database 106. When the database is the World Wide Web, the document location identifier 208 is a URL.

Each child node identifier, such as the first child node identifier 210a, comprises a child node reference 212a and a next child pointer 214a. The child node reference 212a is an identifier of a location of a child node that is associated with the current entry. In an embodiment, the child node reference 212a is a pointer to a memory location. The next child pointer 214a points to the next child node identifier 210b that is associated with the entry. Thus, the first and second child node identifiers 210a, 210b form a linked list of unlimited length that points to all child nodes of the current entry. The child node identifiers are one way to implement the intermediate tree links 110a, 110b.

The general organization of hash tables is well known in the information processing field and will not be provided here to avoid obscuring the invention. For example, see D. Knuth, "The Art of Computer Programming," vol. 3, section 6.4 ("Hashing") (Reading, Mass.: Addison-Wesley, 1973).

Each intermediate tree link 110a–110b is generated in accordance with the relevancy of each document with respect to the user, and the efficiency of each index term to differentiate between relevant documents. The relevancy of each document is a function of both the user-selected index terms and weighted relevancy ranking of index terms. The efficiency of each index term is computed from the distribution of the index terms among the documents. Preferably, the computation of the efficiency values is carried out when the browser engine 134 initializes at the start of a session. In an embodiment, the efficiency value has a range of values from "0" to "100" and is computed using the following equation:

$$\text{Efficiency} = (\text{DifferentIndexValues}/\text{TotalDocumentsWithIndexTerm}) * 100$$

In the foregoing equation, "Efficiency" represents the efficiency value. "DifferentIndexValues" represents the number of different values that are carried by a particular index term among all documents in the hypertext database. "TotalDocumentsWithIndexTerm" is the total number of documents in the hypertext database that are tagged with a particular index term.

Consider an example in which the hypertext database comprises ten (10) documents. All ten (10) documents are tagged with a LANGUAGE index term value. Seven (7) of the documents have a LANGUAGE index term value of ENGLISH, one (1) document has a value of MANDARIN, and one (1) document has a value of ITALIAN. Thus, there are three (3) different values carried by the LANGUAGE index term value. Accordingly, the efficiency value of the LANGUAGE index term value is:

$$\text{Efficiency} = (3/10) * 100 = 30$$

The LANGUAGE index term value has a relatively low efficiency value of "30" because it has relatively low usefulness in differentiating one document from another. Because the great majority of the documents in the database are in ENGLISH, the LANGUAGE index term value has limited use in differentiating one document from another.

In contrast, consider a similar example in which each of the ten documents is prepared in a different language. Thus, the LANGUAGE index term value has ten (10) different values. In that case, the efficiency value would be:

Efficiency=(10/10)*100=100

The high efficiency value of "100" reflects the fact that with ten different values, the LANGUAGE index term is highly useful in differentiating one document in the database from another.

In the most extreme case, when an index term is useless in differentiating a particular document from another document in the database, the index term is defined to have an efficiency value of zero. For example, consider a case in which all documents in the hypertext database are prepared in the English language, so that each document is associated with a LANGUAGE index term that has the value "English". In such a case, a user-selected index term LANGUAGE has an efficiency value of zero.

In an alternate embodiment, the efficiency value is scaled according to the relative usefulness of the values of the index terms. Consider the above example of a ten-document database in which seven (7) of the documents have a LANGUAGE index term value of ENGLISH, one (1) document has a value of MANDARIN, and one (1) document has a value of ITALIAN (the "7-1-1 example"). Also consider a second example in which three (3) have an index term value of ENGLISH, three (3) have an index term value of MANDARIN, and four (4) have an index term value of ITALIAN (the "3-3-4 example"). In the alternate embodiment, a database having a 3-3-4 distribution of values would have higher efficiency values associated with the index terms than the database having a 7-1-1 distribution. The scaled efficiency value could be computed, for example, by taking the mean of each count of values (3, 3, and 4), computing the deviation of each value from the mean, and multiplying the efficiency value by the deviation.

The efficiency term is useful in enabling a tree of links of the documents to be better balanced and easier to traverse. In a tree, it is known that search time is a function of the depth and width of the tree. Generally, a tree that is wide presents the user with numerous decision points. A deep tree presents the user with a long path to a relevant document. Also generally, the ideal depth and width of the tree is a function, in part, of the speed of the network connection used by the user or client 102 to communicate with the browsing engine. For example, when the user has a slow connection, the user has time to make many decisions or complex decisions about where to traverse next. When the user has a fast connection, the user tends to make decisions more quickly, so that it is immaterial whether the tree is deep.

The intermediate tree of dynamically generated intermediate tree links 110a, 110b advantageously enables the user 100 to search incrementally within the hypertext database 106, and to "backtrack" or traverse the hypertext database in reverse order. Backtracking is a significant advantage in certain contexts. For example, in systems such as the World Wide Web that have limited bandwidth, backtracking is easier and faster than restarting a traversal path or query from the beginning or top of the database system.

The depth of the tree of intermediate links 110a, 110b is defined as the number of links between the logical position of the user 100' and the relevant document. The breadth of the tree is defined as the number of links 110a, 110b at the same level of the tree. As described above, elapsed user time is a function of the number of links from the user's position to the relevant document and the number of decisions that the user needs to make to reach the relevant document. The depth of the tree corresponds to the number of links from the user's position to the relevant document. The number of user choices corresponds to the breadth of the tree. Therefore, the elapsed user traversal time is a function of both the depth of the tree and the breadth of the tree.

The complexity of the tree is a function of the breadth of the tree. The greater the breadth of the tree, the more choices that the user must choose from and the greater the chances that an incorrect choice is made. In the preferred embodiment, the browsing engine 134 automatically determines an optimal depth and width of the tree based on the user specified index terms, the weighted relevancy rankings of index terms, and the efficiency values. In the preferred embodiment, the user-specified weighted relevancy rankings of each user-selected index term, the historical weighted relevancy rankings, and the efficiency values are combined to yield a final weighted value, and the final weighted value is the rank of a particular document in the tree. Preferably, in computing the final weighted value, the user-specified weighted relevancy rankings of each user-selected index term have top priority, the historical weighted relevancy rankings have second priority, and the efficiency values have third priority.

The user-specified weighted relevancy rankings of each user-selected index term, the historical weighted relevancy rankings, and the efficiency values are combined using a function that yields the final weighted value. An example function is $F(\text{IndexTerm})=3x+2y+(0.5)z)=\text{FinalWeightedValue}$ in which x is the user-specified weighted relevancy rankings of a user-selected index term, y is the historical weighted relevancy ranking for that term, and z is the efficiency value for that term. Other functions can be used.

When the final weighted value has been computed for all documents, then the intermediate tree is constructed by linking the documents according to their rank as indicated by the final weighted value. For example, the document having the highest final weighted value is the root node of the intermediate tree. All documents having the next highest final weighted value are created as child nodes of the root node, and so on.

Preferably, each set of intermediate tree links is stored as a decision tree that reflects a particular browsing session. When a new user initiates a session with the system, or when a current user initiates a new session, the decision trees are consulted. For example, when a user presses the Apply button 422 of the user interface display 400, the browsing engine 134 searches the stored decision trees to determine the best fit of the relevance information entered by the user in the relevance information pane 430 to the decision trees.

In an alternate embodiment, each decision tree is stored in association with metadata that describes the user or client whose browsing resulted in creation of the decision tree. For example, if the user or client connects to the browsing engine 134 after visiting a financial services company's website, information identifying that site is stored in association with each decision tree created during the user's browsing session. The metadata that describes the user or client is considered by the browsing engine 134 when the decision trees are searched to determine the best fit of the relevance information entered by the user in the relevance information pane 430 to the decision trees. The metadata may also include information that identifies the client specifically, such as an Internet Protocol (IP) address of the client, information that the user registered with the user's browser when the browser was installed, a subscriber number, or other identifying information.

PREFERENCES DIALOG

Figure 5:
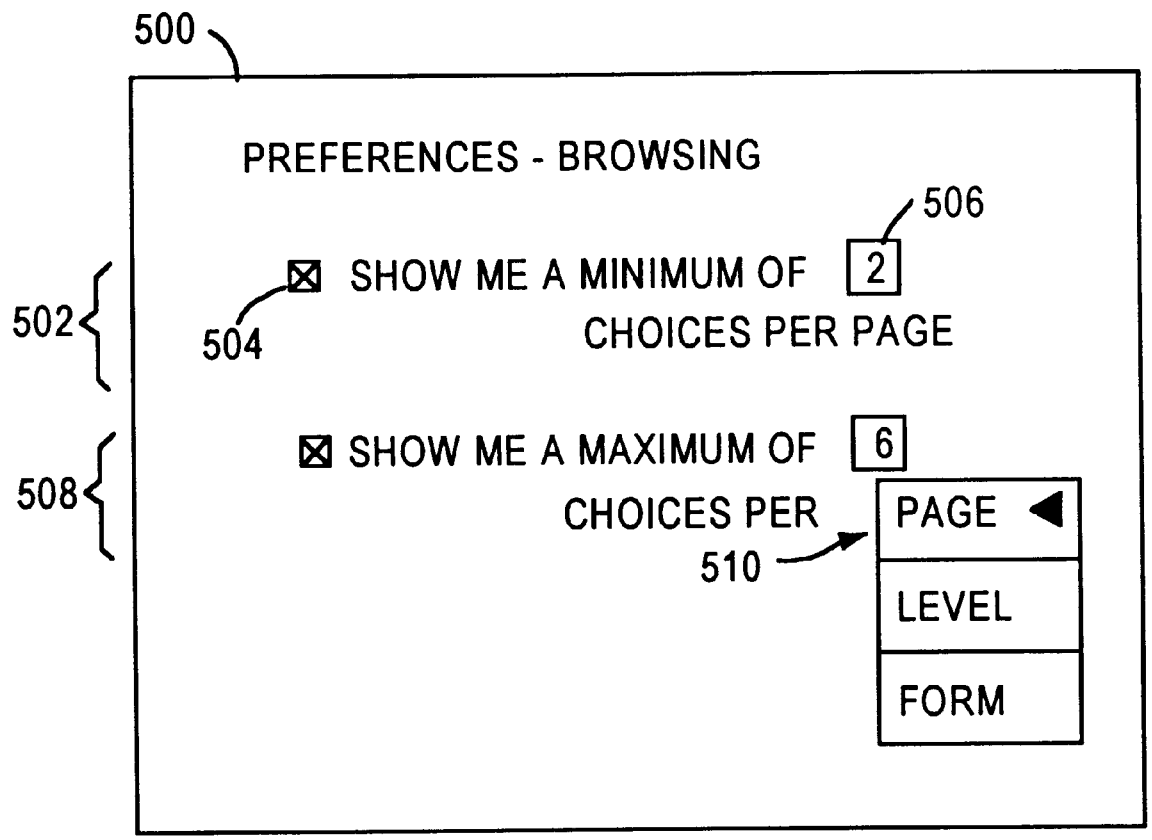
FIG. 5 is a diagram of a preferences dialog that is generated by a preferred embodiment.

In another aspect of the preferred embodiment, under control of the browsing engine, the user may specify the complexity level of the traversal by specifying the maximum breadth of the tree. FIG. 5 is a diagram of a Preferences dialog box 500 that is generated by a preferred embodiment of the browsing engine 134.

The user can activate the Preferences dialog box 500 at any time during execution or use of the browsing engine 134, for example, by selecting a "Preferences" option from a pull-down menu. The Preferences dialog box 500 has a minimum parameter prompt 502, which the user 100 may select or activate by clicking on the check box 504. The user may also enter a value in a data entry field 506 that specifies the minimum number of choices that the user wants the browsing engine 134 to display in the document list 412 of the user interface display 400. Similarly, by responding to a check box and a second data entry field 508 of a maximum parameter prompt 508, the user may specify a maximum number of choices that the user wants the browsing engine to display. The values entered by the user in the data entry field 506 and the second data entry field 508 are stored in a location that is accessible to the browsing engine 134.

By specifying low values for the minimum and maximum values, the user will force the browsing engine to present a long list in the document list 412, which is preferable for a fast connection. By specifying a low minimum value and a high maximum value, the browsing engine will display a wide or flat tree in which there are few levels but many choices per level. This configuration is best suited to slow connections. Thus, using the Preferences dialog box 500 and appropriate minimum and maximum values, the user can control the complexity of the traversal.

In the preferred embodiment, the browsing engine applies hashing formulas to minimize the depth of the tree given the user specified maximum breadth constraint. The browsing engine attempts to balance the tree given the minimum and maximum breadth values, using the index terms as a hashing function.

For example, take a hypertext system with 100 electronic documents. Each electronic document is tagged with a value of a plurality of index terms such as author, publisher, and publication date. The user specifies the relevant values of the indexes, such as "author last name=Hemingway" and "publication date is >1960" and "publication date<1990". The user specifies a weighted relevancy ranking of each index term value, such as "author" has a weight of 10, "publisher" has a weight of 5, and "publication date" has a weight of 2.

In the preferred embodiment, the user is presented with a list of the electronic documents reduced and ordered based on the specified index terms and weighted relevancy ranking of the index terms. In the above example, suppose there are 50 electronic documents matching the specified criteria. In another aspect of the preferred embodiment, the 50 electronic documents are grouped into buckets of a hash table based on the specified index terms and weighted relevancy ranking of the index terms. An intermediate tree is then generated dynamically to link the grouped buckets to the user's position. The browsing engine attempts to balance the tree in order to attempt to minimize both depth and breadth of the tree.

Now assume that a second user begins using the system. The second user also specifies "author last name= Hemingway" but leaves and "publication date" unspecified. The user specifies a weighted relevancy ranking of "author" as 10 and leaves all other weights blank. The system identifies the second user's relevance information as similar to the first user's information. Thus, based on the historical relevance information about the first user that is known to the system, the system assumes that the remaining values should be the same as those for the first user. The historical information is derived from one or more decision trees that are constructed based on past browsing activities of prior users. For example, the intermediate tree links are stored in the form of one or more decision trees, and are searched when a new query is initiated by a user.

HARDWARE OVERVIEW

Figure 6:
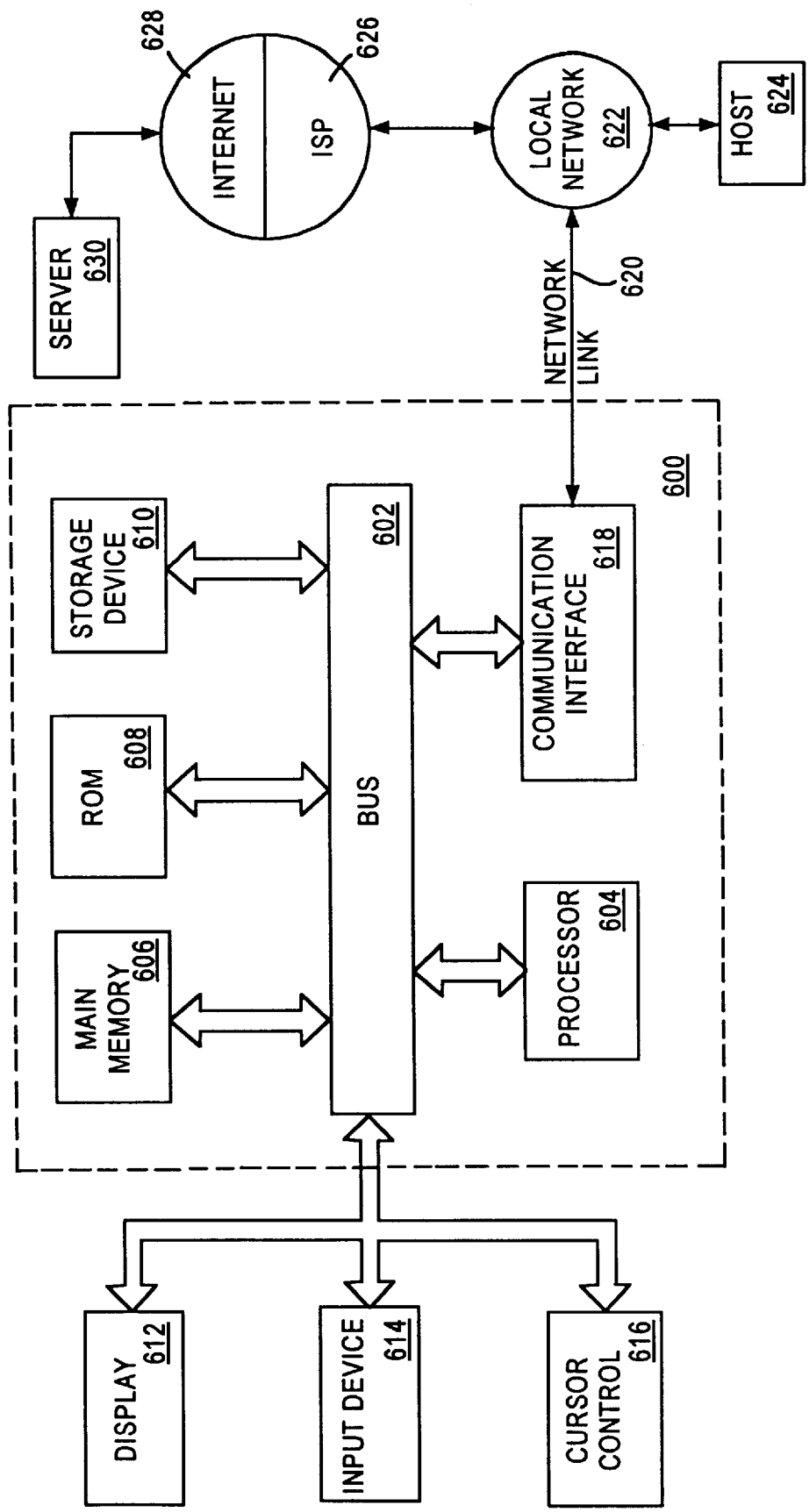
FIG. 6 is a diagram of a computer system with which an embodiment may be operated.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for traversing a hypertext database. According to one embodiment of the invention, traversing a hypertext database is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for traversing a hypertext database as described herein.

The received code may be executed by processor 604 as it is received, and/or stored in storage device 610, or other non-volatile storage for later execution. In this manner, computer system 600 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for a user of a computer system to traverse a hypertext database to retrieve an electronic document stored in the hypertext database, the method comprising the steps of:
   (A) storing in the hypertext database a plurality of hypertext nodes, each of the hypertext nodes corresponding to an electronic document, wherein each of the hypertext nodes may be selectively linked to another of said hypertext nodes;
   (B) storing an index in association with the hypertext database, the index comprising a plurality of descriptive index terms, in which each of the descriptive index terms is assigned to one of the electronic documents;
   (C) receiving a weighted relevancy ranking of each descriptive index term;
   (D) receiving a set of relevant index term values;
   (E) comparing the set of relevant index term values with sets of the descriptive index terms using the weighted relevancy ranking and the set of relevant index term values;
   (F) producing a list of electronic documents based on the comparing step (E), in which the list is ranked in accordance with the relevancy of each document with respect to the user based on the weighted relevancy ranking and in which each document in the list contains at least one of the relevant index term values.

2. The method of claim 1, wherein step (C) further includes the step of receiving a weighted relevancy ranking that is combined with a historical weighted relevancy ranking, and in which step (E) further includes the step of for the purpose of comparing the set of relevant index term values with sets of the descriptive index terms using the weighted relevancy ranking, the set of relevant index term values, and the historical weighted relevancy ranking.

3. The method recited in claim 1, further comprising the step of receiving a historical weighted average relevancy rank value for each of the descriptive index terms, and in which step (C) comprises the step of setting a weighted relevancy ranking of each descriptive index term equal to the historical weighted average relevancy rank value for that descriptive index term.

4. The method recited in claim 1, further comprising the step of linking the ranked list of electronic documents to an intermediate tree, in which the intermediate tree is linked to the user's position within the hypertext database.

5. The method recited in claim 1, further comprising the step of linking each electronic document in the hypertext database to a present position of the user in the hypertext database by an intermediate, dynamically generated tree link.

6. The method recited in claim 5, further comprising the step of generating each intermediate, dynamically generated tree link in accordance with relevance to the user of the document to which the tree link is linked and in accordance with efficiency of each index term to differentiate between relevant documents.

7. The method recited in claim 5, further including the step of computing relevance to the user of the document to which the tree link as a function of the set of index terms and the weighted relevancy ranking of the index terms.

8. The method recited in claim 5, further including the step of computing efficiency of each index term from the distribution of the index term in the documents.

9. The method of claim 5, wherein the step of indexing the hypertext database includes the step of assigning a efficiency value to each index term, in which the efficiency value is a numerical indication of how well each descriptive index term differentiates the tree links.

10. The method of claim 9, in which step (F) further includes the step of ranking the documents based on a weighted combination of the user relevancy ranking of each descriptive index term and the efficiency value of each descriptive index term.

11. The method as recited in claim 5, further including the step of receiving from the user a limit value that identifies a maximum breadth of a tree of the tree links and thereby limits browsing complexity.

12. The method of claim 11, further including the step of applying a hashing formula that uses the index terms, to minimize a depth of the tree based upon the limit value, and to thereby balance the tree.

13. A computer-readable medium carrying one or more sequences of instructions for a user of a computer system to traverse a hypertext database to retrieve an electronic document stored in the hypertext database, wherein execution of the one or more sequences of instructions by one or more processors causes the one or more processors to perform the steps of:

(A) storing in the hypertext database a plurality of hypertext nodes, each of the hypertext nodes corresponding to an electronic document, wherein each of the hypertext nodes may be selectively linked to another of said hypertext nodes;

(B) storing an index in association with the hypertext database, the index comprising a plurality of descriptive index terms, in which each of the descriptive index terms is assigned to one of the electronic documents;

(C) receiving a weighted relevancy ranking of each descriptive index term;

(D) receiving a set of relevant index term values;

(E) comparing the set of relevant index term values with sets of the descriptive index terms using the weighted relevancy ranking and the set of relevant index term values;

(F) producing a list of electronic documents based on the comparing step (E), in which the list is ranked in accordance with the relevancy of each document with respect to the user based on the weighted relevancy ranking and in which each document in the list contains at least one of the relevant index term values.

14. The computer-readable medium of claim 13, wherein step (C) further includes the step of receiving a weighted relevancy ranking that is combined with a historical weighted relevancy ranking, and in which step (E) further includes the step of for the purpose of comparing the set of relevant index term values with sets of the descriptive index terms using the weighted relevancy ranking, the set of relevant index term values, and the historical weighted relevancy ranking.

15. The computer-readable medium recited in claim 13, further comprising the step of receiving a historical weighted average relevancy rank value for each of the descriptive index terms, and in which step (C) comprises the step of setting a weighted relevancy ranking of each descriptive index term equal to the historical weighted average relevancy rank value for that descriptive index term.

16. The computer-readable medium recited in claim 13, further comprising the step of linking the ranked list of electronic documents to an intermediate tree, in which the intermediate tree is linked to the user's position within the hypertext database.

17. The computer-readable medium recited in claim 13, further comprising the step of linking each electronic document in the hypertext database to a present position of the user in the hypertext database by an intermediate, dynamically generated tree link.

18. The computer-readable medium recited in claim 17, further comprising the step of generating each intermediate, dynamically generated tree link in accordance with relevance to the user of the document to which the tree link is linked and in accordance with efficiency of each index term to differentiate between relevant documents.

19. The method recited in claim 17, further including the step of computing relevance to the user of the document to which the tree link as a function of the set of index terms and the weighted relevancy ranking of the index terms.

20. The method recited in claim 17, further including the step of computing efficiency of each index term from the distribution of the index term in the documents.

* * * * *